(12) United States Patent
Joyce et al.

(10) Patent No.: US 7,343,470 B1
(45) Date of Patent: Mar. 11, 2008

(54) TECHNIQUES FOR SEQUENTIALLY TRANSFERRING DATA FROM A MEMORY DEVICE THROUGH A PARALLEL INTERFACE

(75) Inventors: Juju Joyce, Milpitas, CA (US); Dan Mansur, Redwood City, CA (US); David Jefferson, Morgan Hill, CA (US); Changsong Zhang, Santa Clara, CA (US); Yi-Wen Lin, San Jose, CA (US)

(73) Assignee: Altera Corporation, San Jose, CA (US)

( * ) Notice: Subject to any disclaimer, the term of this patent is extended or adjusted under 35 U.S.C. 154(b) by 536 days.

(21) Appl. No.: 10/673,081

(22) Filed: Sep. 26, 2003

(51) Int. Cl.
*G06F 12/00* (2006.01)
*G06F 13/00* (2006.01)

(52) U.S. Cl. .................... 711/218; 711/100; 711/154; 711/200

(58) Field of Classification Search ............. 711/100, 711/103, 154, 200, 217, 218
See application file for complete search history.

(56) References Cited

U.S. PATENT DOCUMENTS

| | | | |
|---|---|---|---|
| 4,870,302 A | 9/1989 | Freeman | |
| 4,930,107 A | 5/1990 | Chan et al. | |
| 5,200,920 A | 4/1993 | Norman et al. | |
| 5,237,219 A | 8/1993 | Cliff | |
| 5,543,730 A | 8/1996 | Cliff et al. | |
| 5,581,777 A * | 12/1996 | Kim et al. ............. | 712/16 |
| 5,590,305 A | 12/1996 | Terrill et al. | |
| 5,596,734 A * | 1/1997 | Ferra .................... | 710/5 |
| 5,600,819 A * | 2/1997 | Kamada et al. ........ | 711/169 |
| 5,603,001 A * | 2/1997 | Sukegawa et al. ..... | 711/103 |
| 5,606,276 A | 2/1997 | McClintock | |
| 5,644,531 A * | 7/1997 | Kuo et al. ............. | 365/185.11 |
| 5,650,734 A | 7/1997 | Chu et al. | |
| 5,680,061 A | 10/1997 | Veenstra et al. | |
| 5,694,056 A * | 12/1997 | Mahoney et al. ...... | 326/38 |
| 5,767,734 A | 6/1998 | Vest et al. | |
| 5,844,854 A | 12/1998 | Lee | |
| 5,869,980 A | 2/1999 | Chu et al. | |
| 5,873,113 A | 2/1999 | Rezvani | |
| 6,011,406 A | 1/2000 | Veenstra | |
| 6,052,755 A | 4/2000 | Terrill et al. | |
| 6,184,705 B1 | 2/2001 | Cliff et al. | |
| 6,242,941 B1 | 6/2001 | Vest et al. | |
| 6,314,550 B1 | 11/2001 | Wang et al. | |

(Continued)

OTHER PUBLICATIONS

U.S. Appl. No. 10/106,675, filed Mar. 25, 2002, Rangan et al.

(Continued)

*Primary Examiner*—Tuan V. Thai
(74) *Attorney, Agent, or Firm*—Townsend and Townsend and Crew LLP

(57) ABSTRACT

Techniques are provided for synchronously transmitting data in parallel from an external memory device to a destination circuit using a sequential read mode. The memory device includes an address counter. The address counter generates sequential read addresses for the data bits stored in the memory device. The destination circuit generates a clock signal that controls the address counter. The destination circuit can also transmit a start address to the memory device. The address counter sequentially generates a new read address in response to transitions in the clock signal beginning with the start address. Data bits are transferred in parallel from the memory device to the destination circuit.

20 Claims, 3 Drawing Sheets

U.S. PATENT DOCUMENTS 6,662,291 B2* 12/2003 Hashimoto et al. ......... 711/217
6,714,044 B1 3/2004 Rangan et al.
2002/0023191 A1* 2/2002 Fudeyasu .................... 711/104

OTHER PUBLICATIONS

"128Mb, 64Mb, 32Mb Q-Flash Memory, MT28F128J3, MT28F640J3, MT28F320J3," Micron Technology, Inc. MT28F640J3_7.p65-Rev.6, Aug. 2002, 52 pages total.

"16-megabit 2.7-volt Only Serial DataFlash, AT45DB161," Atmel, Rev. 0807E-01/01, Jan. 2001, 21 pages total.

"32-megabit 2.7-volt Only DataFlash, AT45DB321B," Atmel. Rev. 2223E-DFLASH-11/03, Nov. 2003, 32 pages total.

"32-megabit 2.7-volt Only Serial DataFlash, AT45DB321," Atmel. Rev. 1121E-01/01, Jan. 2001, 21 pages total.

"64-megabit 2.7-volt Only Dual-interface DataFlash, AT45DB642," Atmel. Rev. 1638F-DFLSH-09/02, Sep. 2002, 37 pages total.

"In-System Programmable Configuration PROM, AT17F040, AT17F080," Atmel. Rev. 3039D-CNFG-4/03, Apr. 2003, 18 pages total.

"Intel StrataFlash Wireless Memory System (LV18/LV30 SCSP) 768-Mbit LVQ Family with Asynchronous Static RAM Datasheet," Dec. 2003, 54 pages.

"Using Remote System Configuration with Stratix & Stratix GX Devices," Altera Corporation. Application Note 217, AN-217-2.1. Nov. 2002, 28 pages total.

* cited by examiner

TECHNIQUES FOR SEQUENTIALLY TRANSFERRING DATA FROM A MEMORY DEVICE THROUGH A PARALLEL INTERFACE

BACKGROUND OF THE INVENTION

The present invention relates to techniques for transmitting data from a memory device through a parallel interface, and more particularly, to techniques for transmitting data from a memory device using a parallel sequential read mode.

Programmable integrated circuits such as field programmable gate arrays (FPGAs) are configured (i.e., programmed) using configuration data. Configuration data used to configure a programmable circuit can be stored in an external memory device such as a FLASH memory device.

Configuration data can be transferred in serial or in parallel from a FLASH memory device to an FPGA. For parallel data transfer, some types of prior art FPGAs interface directly with the FLASH memory device using 35 input/output (IO) pins on the FPGA.

The FPGA interfaces directly with the FLASH memory using Asynchronous Read Mode. In this scenario, 23 address pins are provided by the FPGA. In addition to the 23 address pins, 8 data pins and 4 control pins (total 35) are consumed on the FPGA to implement this data transfer system.

Other types of prior art FPGAs interface with the FLASH device via a microcontroller. The microcontroller is a discrete chip or a controller chip that is packaged together with the FLASH memory device in a single package. If the microcontroller is a discrete chip, the microcontroller sits between the FPGA and the FLASH memory device.

The microcontroller reads data from the FLASH device, then passes the data to the FPGA. Specifically, the microcontroller generates memory addresses and transfers the memory addresses to the FLASH device. The FLASH device then transfers data bits that are stored at the received memory addresses to the FPGA in parallel.

The FLASH device only transfers data bits to the FPGA in response to memory addresses received from the microcontroller. This type of data transfer is referred to as asynchronous read mode. Because each set of data bits needs to be individually addressed by the microcontroller, data transfer from the FLASH device to the FPGA is slow.

Therefore, there is a need to provide faster techniques for transferring configuration data from an external memory device to a programmable integrated circuit that requires less pins.

There is also a need to eliminate the microcontroller from prior art configuration data transfer techniques and to have the FPGA and FLASH interface directly to save board space, device cost (for the microcontroller), and development time to write FLASH-FPGA interface code for the microcontroller.

BRIEF SUMMARY OF THE INVENTION

The present invention provides techniques for synchronously transmitting data in parallel from a memory device to a destination circuit using a sequential read mode. The present invention eliminates the need for a separate microcontroller chip to transfer data from the memory device. Instead, the destination circuit interfaces directly with the memory device using less pins than prior art techniques.

According to the present invention, the memory device includes an address counter. The address counter generates sequential read addresses to access data bits stored in the memory device. The destination circuit generates a clock signal that controls the address counter.

The destination circuit can also transmit a start address to the memory device. The address counter sequentially generates a new read address in response to transitions in the clock signal beginning with the start address. Data bits are transferred in parallel from the memory device to the destination circuit.

By eliminating the microcontroller and transferring data from the memory device using a parallel sequential read mode, the present invention requires less pins, saves board space, reduces cost and design effort, and transfers data at greater speeds. Because the read mode of the present invention is sequential, it can read data at a faster rate by using faster Page Mode reads, which are offered by most asynchronous parallel FLASH devices.

Other objects, features, and advantages of the present invention will become apparent upon consideration of the following detailed description and the accompanying drawings, in which like reference designations represent like features throughout the figures.

DETAILED DESCRIPTION OF THE INVENTION

The present invention provides techniques for synchronously transferring data in parallel from an external memory device to a destination circuit in a sequential read mode.

The destination circuit can be a programmable integrated circuit such as a field programmable gate array (FPGA), a programmable logic device (PLD), a programmable logic array (PLA), a configurable logic array, etc. The destination circuit can also be an application specification integrated circuit (ASIC), or an ASIC/FPGA hybrid. Although the present invention is discussed primarily in the context of an FPGA as the destination circuit, it should be understood that the destination circuit can be any suitable integrated circuit and that FPGAs are discussed herein merely as an example of the present invention.

Data is transferred to the destination circuit from an external memory device such as a FLASH or EEPROM memory device. Although the present invention is discussed primarily in the context of FLASH memory devices, it should be understood that the principles of the present invention can be applied to any suitable external memory device.

Figure 1:
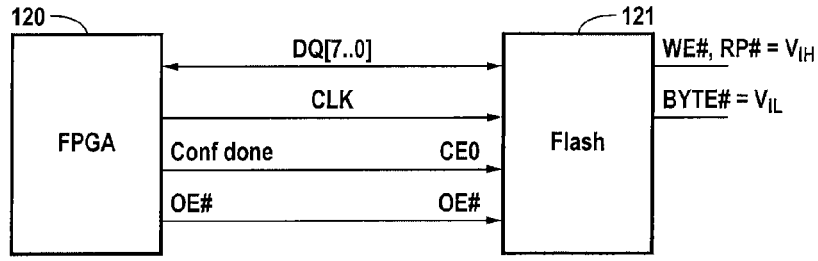
FIG. 1 illustrates a system for sequentially reading data from an external memory device according to an embodiment of the present invention.

FIG. 1 illustrates a system for transferring parallel configuration data in sequential read mode. The system of FIG. 1 includes a destination circuit 120 and a FLASH memory device 121. In the example of FIG. 1, destination circuit 120 is a field programmable gate array (FPGA). Also, the data that is stored in FLASH 121 and transferred to FPGA 120 is configuration data that is used to configure programmable circuit elements in FPGA 120.

FPGA 120 transmits a chip enable signal CEO to FLASH memory device 121. FPGA 120 sets the voltage of signal CEO to a first voltage level $V_{IL}$ or a second voltage level $V_{IH}$. When CEO is at $V_{IL}$, memory device 121 can operate in sequential read mode. In sequential read mode, memory device 121 transfers data bytes to FPGA 120 in response to sequentially generated read addresses.

More specifically, when CEO is at $V_{IL}$, memory device 121 is enabled and enters its default mode (e.g., Asynchronous Read Mode for most standard parallel flash devices). After device 121 is enabled, Sequential Read Mode is entered when device 121 sees two edges on the CLK line according to one embodiment of the present invention that is illustrated in the timing diagram of FIG. 2B.

Figure 2A:
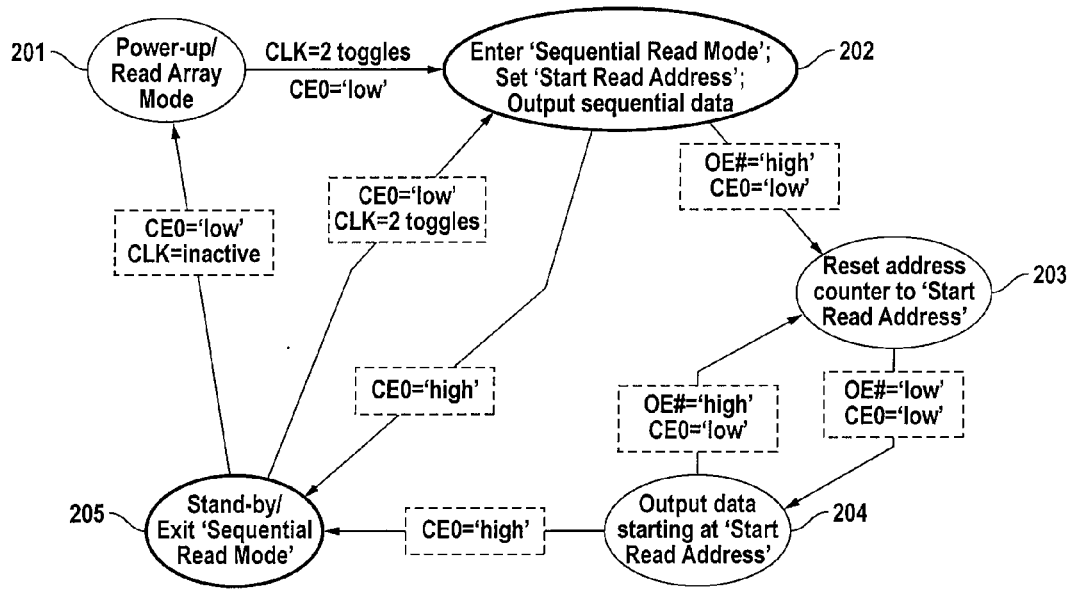
FIG. 2A illustrates a state diagram for a sequential parallel read mode according to an embodiment of the present invention.
Figure 2B:
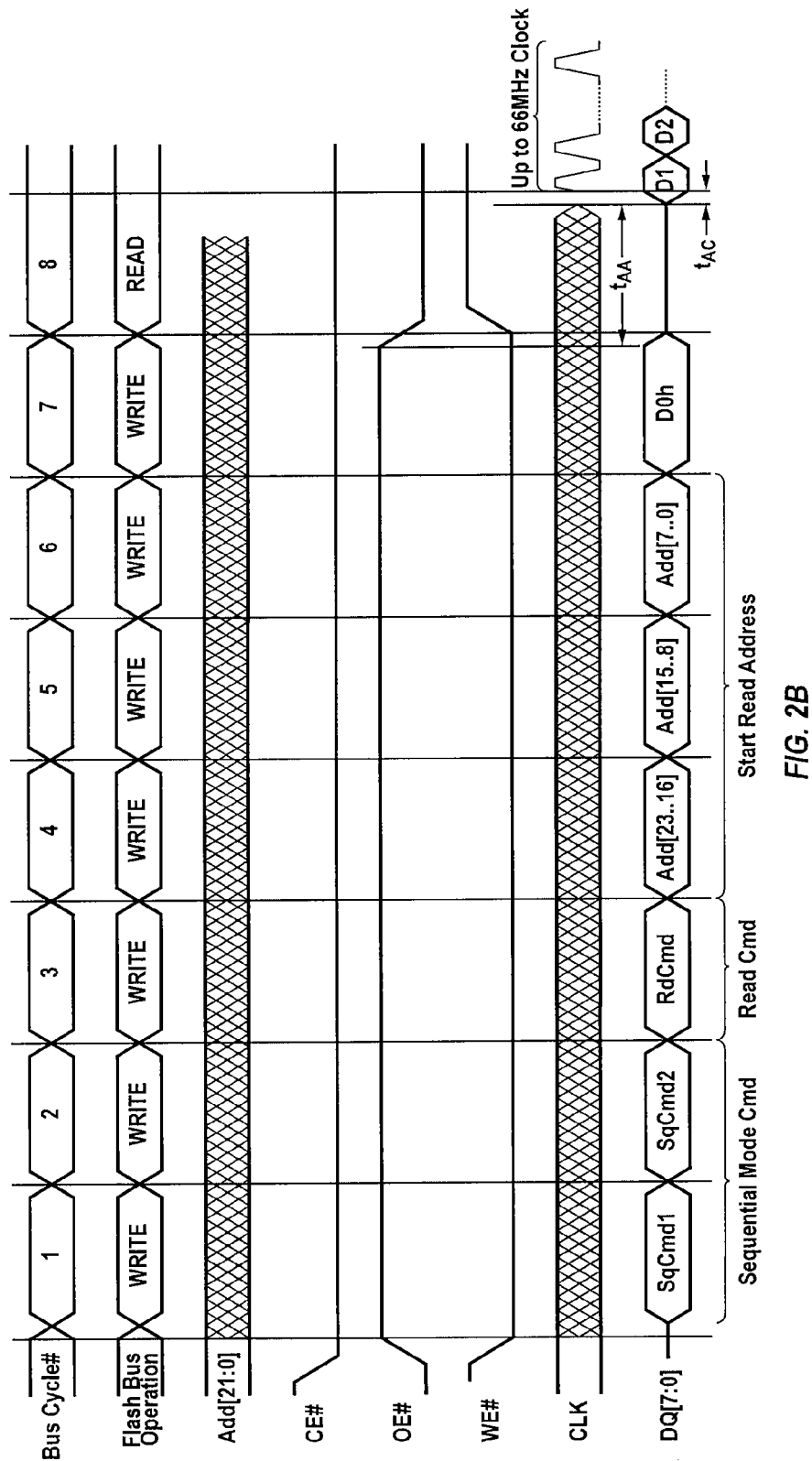
FIG. 2B illustrates a timing diagram for a sequential parallel read mode according to an embodiment of the present invention.

In another embodiment, Sequential Read Mode is entered when a "Sequential-Mode-Command" is asserted via the DQ[7 . . . 0] lines as shown in FIG. 2B, while holding a write enable signal (WE#) at $V_{IL}$. When CEO is at $V_{IH}$, memory device 121 is disabled and does not operate.

FPGA 120 transfers an 8-bit start read address to FLASH memory device 121 along signal lines DQ[7:0] after the Sequential-Mode-Command as shown in FIG. 2B. The start read address can have more than 8 bits (e.g., 20 bits). Signal lines DQ can include any suitable number of signal lines, for example 16, if 16-bit parallel data transfer is desired. If more than 8 bits need to be transferred, and the interface has only 8 signal lines DQ, data byte transfer is done in multiple cycles. That is, in first cycle send bits 1-8, second cycle send bits 9-16, third cycle send 17-20, etc.

FLASH memory 121 includes an address counter. In sequential read mode, the address counter sequentially generates read address signals beginning with a start read address received from FPGA 120. Thus, the FPGA sets the start read address.

The address counter generates subsequent read addresses by sequentially incrementing the start read address. There can be a delay (e.g., 120 ns) between when device 121 receives the start read address and when device 121 begins to output data. Flash 121 is set to Sequential Read Mode by FPGA 120 prior to sending the Start Read Address. Flash 121 can be set to Sequential Read Mode via 2 clock edges generated by FPGA 120 as mention above, in one embodiment. In another embodiment, Sequential Read Mode can be entered by sending an instruction code via data lines DQ.

In sequential read mode, the address counter automatically increments the read address in response to each rising edge (or each falling edge) of clock signal CLK. FPGA 120 generates clock signal CLK to control the transfer rate of data to the FPGA. The frequency of CLK can be, for example, 25 or 40 MHz. The maximum frequency of CLK is determined by how fast Flash 121 can provide data. In an alternative embodiment of the present invention, the address counter automatically decrements the read address in response to each rising or each falling edge of CLK.

In response to each new read address, FLASH memory 121 accesses a byte of data from its memory array and transfers that data byte along parallel signal lines DQ to FPGA 120. Thus, memory 121 transfers a byte of data along signal lines DQ to FPGA 120 after each rising or each falling edge of CLK. A byte of data can include any suitable number of bits (e.g., 8 bits).

In order to make data transfer faster, a Flash device 121 can access data from its memory array, in advance, ahead of the address counter. More specifically, a set of data from neighboring address locations can be accessed at one time using Page Mode Access available in most standard parallel FLASH devices. However, data is only transferred via the data lines once the address counter has sequentially counted up to that specific data location in response to the CLK edge.

In FIG. 1, there are 8 parallel data signal bus lines DQ. In the present invention, data can be transferred from an external memory device to a destination circuit along any appropriate number of parallel signals. For example, 16 data bus lines can transfer 16 parallel bits from memory 121 to FPGA 120.

FPGA 120 also generates an output enable signal OE#. Signal OE# has two values, $V_{IL}$ and $V_{IH}$. The address counter begins to automatically increment the read addresses in sequential read mode when the OE# signal is $V_{IL}$. When OE# is at $V_{IH}$, the address counter resets the read address to the start read address. When OE# returns to $V_{IL}$, memory device 121 again provides data on signal lines DQ beginning at the start read address at every rising or at every falling edge of CLK.

The data transfer system of FIG. 1 is advantageous, because FPGA 120 does not use a separate microcontroller chip and only uses 11 pins to transfer parallel data from external memory device 121. FPGA 120 uses 8 data pins for lines DQ, one clock pin for CLK, one pin for signal CEO, and one pin for signal OE#. Therefore, more pins on FPGA 120 are freed up for other uses. Prior art systems typically use about 35 pins or a microcontroller.

The synchronous and Sequential read mode of the present invention transfers configuration data at faster speeds than asynchronous read modes by taking advantage of faster Page/Burst Mode Access offered by many Flash devices.

The data transfer system of FIG. 1 can also be used to transfer data from memory device 121 to FPGA 120 during the user mode of the FPGA. User mode occurs after the FPGA has been configured according to a user design and is operated as configured by the user. Logic circuitry inside FPGA 120 can access data inside device 121 during user mode using the sequential read mode and the interface shown in FIG. 1. By allowing FPGA 120 to access memory device 121 during user mode, the user can use any remaining memory storage in device 121 for additional memory requirements of the user design.

FIG. 2A illustrates a state diagram for a parallel sequential read mode according to an embodiment of the present invention. After power-up, when signal CEO goes LOW, memory device 121 is enabled and enters the default asynchronous read mode (i.e., read array mode) 201 during which device 121 is prepared to read data from its memory array.

When clock signal CLK toggles, memory device 121 enters sequential read mode 202. Signal OE# is initially HIGH. FPGA 120 sets the start read address and transfers it to device 121. A certain time (e.g. 120 ns) after OE# goes from HIGH to LOW, memory device 121 starts outputting sequential data to FPGA 120 beginning with the start read address. When signal CEO goes HIGH, memory device 121 enters standby mode 205.

When in standby mode 205, if signal CEO goes LOW and CLK toggles, memory device 121 goes into sequential read mode 202 as shown in FIG. 2A. At a micro level, this transition occurs in two steps. First, signal CEO goes LOW, causing Flash 121 to exit Standby Mode 205 and enter the default mode 201 (Read Array Mode). Then, when CLK toggles, Flash 121 goes into Sequential Read Mode 202.

When in state 202, if signal OE# goes back to HIGH and signal CEO is still LOW, memory device 121 resets the address counter to the start read address in state 203. This is to recover for any errors that may happen during data transmission. FPGA 120 can detect errors and restart the data download. In state 203, if CEO goes HIGH, memory device 121 is disabled and goes into standby (state 205). In fact, any time signal CEO goes HIGH memory device 121 is disabled and goes in to standby.

When in state 203, when signal OE# goes LOW, memory device 121 goes to state 204 and outputs data to FPGA 120 beginning at the start read address. When signal OE# goes HIGH again, the address counter in device 121 is reset to the start read address. When signal CEO goes HIGH, memory device 121 enters standby mode 205.

The techniques of the present invention are advantageous, in part, because it is fairly simple to add the Sequential Read Mode interface shown in FIG. 1 to an asynchronous-parallel-FLASH device. Sequential Read Mode mostly uses the existing pins on an asynchronous-parallel-FLASH device. The only new pin this interface adds on the FLASH device is the clock pin.

An alternative embodiment without signal OE# is possible. In this embodiment, Flash 121 starts outputting data upon receiving the CLK edges (or a READ command). To reset address counter, FPGA 120 can re-issue the READ command and Start Read Address.

According to further embodiments of the present invention, the system and interface shown in FIG. 1 supports other operations including write mode, erase mode, and a regular read mode using the same (or about the same) number of pins that are used in sequential read mode. During write mode, data is written from FPGA 120 into memory device 121 along lines DQ.

For write operations, a write enable signal can be added to the bus lines shown in FIG. 1 that connect devices 120 and 121. An embodiment without a WE signal is possible. In this embodiment, a WRITE command is issued instead via the data lines DQ.

During erase mode, FPGA 120 issues an ERASE command via data lines DQ which causes memory 121 to erase data stored in memory device 121. In regular (asynchronous) read mode, FPGA 120 issues a READ command and a read address along signal lines DQ, and subsequently receives the data back along signal lines DQ.

The FPGA can transfer a command code to memory device 121 along lines DQ during a command cycle. The command code indicates whether the memory device is to read, write, or erase data. A data cycle follows the command cycle, during which data is transferred between FPGA 120 and memory 121. During some operations such as erase mode during which there is no data transfer between the two devices, the data cycle can be an inactive cycle that provides memory device 121 time to erase itself. Alternatively, the data cycle can be an empty cycle in erase mode, or the data cycle can be skipped in erase mode. In all of the various memory modes that device 121 can operate in, FPGA 120 acts as the master device and memory 121 acts as the slave device.

According to another embodiment of the present invention, memory device 121 includes in-system programmability (ISP). ISP is the ability of a user to load FPGA configuration data into memory device 121 without taking memory device 121 off the board and putting device 121 in a special FLASH programmer. ISP enables FLASH memory device 121 to be programmed through a download cable, while FLASH device 121 remains on the board.

The ISP feature can be achieved in several ways. For example, JTAG features can be added to memory device 121. New configuration data can be loaded into the memory array of device 121 in ISP mode through JTAG pins on memory device 121 using a download cable. The JTAG pins on device 121 can be dual-purpose, such that the pins act as JTAG pins in ISP mode, and performs some other function in other modes.

For example, a custom implementation of ISP via JTAG pins can be accomplished with 4 JTAG pins, a JTAG controller, and a set of programming registers, without adding boundary scan cells on input/output (IO) pins. "Custom" means the implementation of ISP via JTAG pins is not as recommended by the IEEE standard. IEEE JTAG standard (IEEE 1149.1) requires boundary scan cells on all IO. This could be a major cost adder for Flash devices, because Flash devices currently don't have Boundary Scan cells on IO pins, and technically, Boundary scan cells on IO pins are not needed to perform ISP.

As another example, the ISP feature can be implemented through FPGA 120. In this embodiment, new configuration data is loaded into memory device 121 through FPGA 120. FPGA 120 receives the new configuration data via its JTAG pins. The new configuration data is then loaded from FPGA 120 into memory device 121 through parallel pins DQ.

In this embodiment, the user can dedicate additional FPGA IO pins for providing addresses and control signals to memory device 120. The address and control signals are used to write the new configuration data into memory device 121. In order to program the Flash device via the FPGA, the FPGA is loaded with a "Flash Programmer" design via FPGA's JTAG pins. Once the "Flash Programmer" design starts running inside the FPGA, FPGA can receive Flash program data from the FPGA's JTAG pins and program that data in to the FLASH device via the FPGA-Flash interface.

An FPGA can perform ISP on FLASH memory using 35 pins in asynchronous mode. Alternatively, an FGPA can use the Sequential Read Mode (e.g., with 12 pins) to perform ISP on FLASH, provided FLASH supports Sequential Read Mode. Sequential Read Mode also needs to support WRITE and ERASE commands in order to perform ISP via an FPGA.

The present invention can also be used to support remote system configuration of an FPGA. Using remote system configuration, an FPGA device receives new configuration data from a remote source, updates the content of the external memory device though the FPGA-Flash interface, and then reconfigures itself by reading the new data from the Flash.

The FPGA user can load the starting address of a new configuration image in the flash-controller address counter inside the FPGA. The new configuration image is the remotely received configuration data. The flash controller is a circuit inside the FPGA that interfaces with the external Flash device. When loading the new configuration image from the external memory device, the FPGA starts downloading data from the memory device address loaded in the FPGA's flash-controller address counter by specifying this address as the start read address when interfacing with the external memory device.

The present invention can also be used to program a cascaded chain of multiple FPGAs. Each of the FPGAs in the cascade chain supports a parallel synchronous configuration interface (e.g. Passive Parallel Synchronous configuration mode found in Altera FPGAs) to receive the configuration data. One of the FPGAs is a master device that controls the external memory device and the other FPGA devices. The other FPGA devices in the chain are slave devices. The slave FPGAs are clocked by a CLK signal generated by the Master FPGA.

Once the master FPGA has downloaded its configuration image from the Flash device, the master FPGA initiates configuration of the first slave device in the chain. Once each slave device has received its respective configuration image from Flash, it enables the subsequent slave device in the chain. Configuration is complete when the last slave device in the chain has received its configuration image from the Flash.

Figure 3:
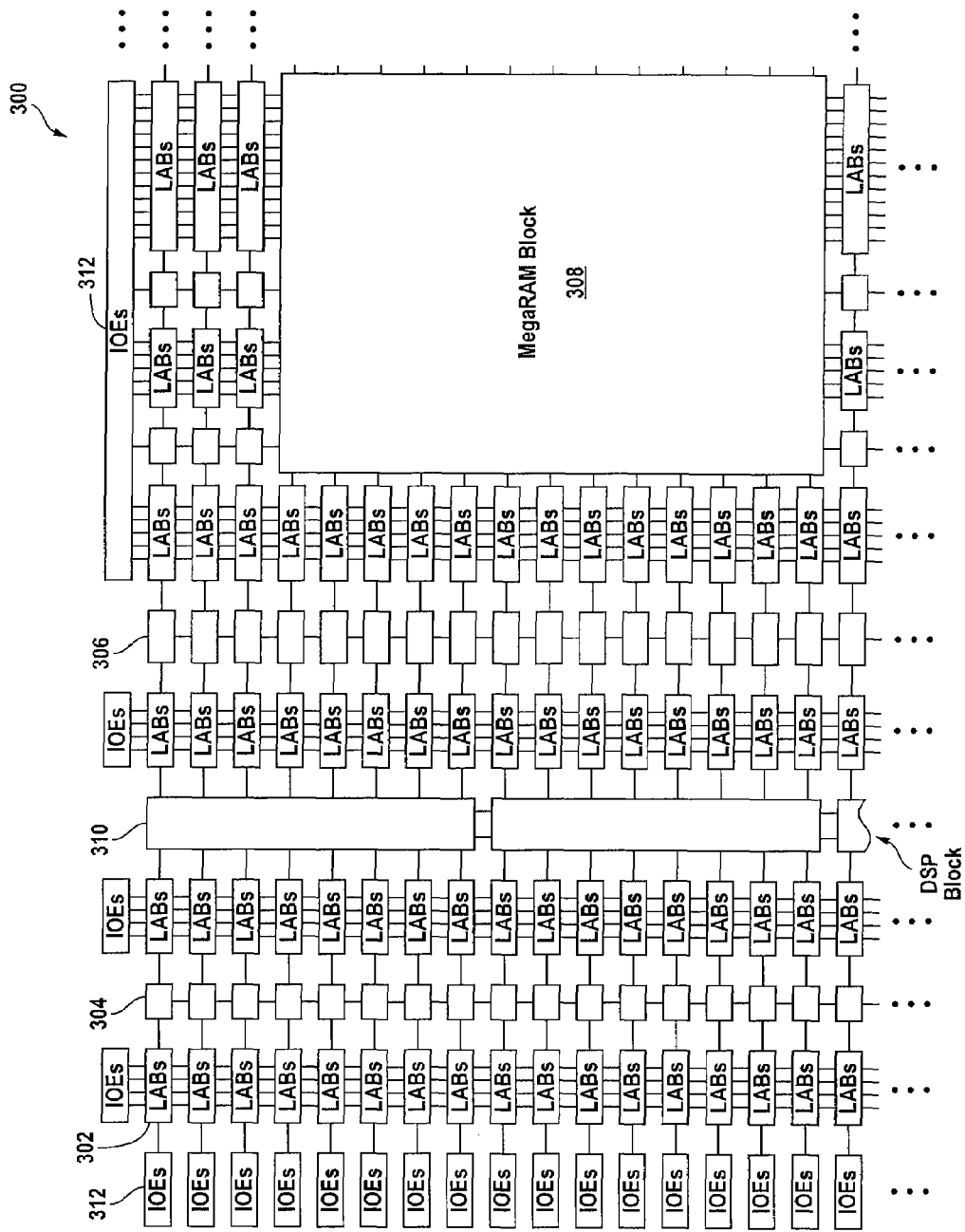
FIG. 3 is a simplified block diagram of a programmable logic device that can implement embodiments of the present invention.

FIG. 3 is a simplified partial block diagram of an exemplary high-density FPGA/PLD 300 wherein techniques of the present invention can be utilized. PLD 300 includes a two-dimensional array of programmable logic array blocks (or LABs) 302 that are interconnected by a network of column and row interconnects of varying length and speed. LABs 302 include multiple (e.g., 10) logic elements (or LEs), an LE being a small unit of logic that provides for efficient implementation of user defined logic functions.

PLD 300 also includes a distributed memory structure including RAM blocks of varying sizes provided throughout the array. The RAM blocks include, for example, 512 bit blocks 304, 4K blocks 306 and a MegaBlock 308 providing 512K bits of RAM. These memory blocks can also include shift registers and FIFO buffers. PLD 300 further includes digital signal processing (DSP) blocks 310 that can implement, for example, multipliers with add or subtract features. I/O elements (IOEs) 312 located, in this example, around the periphery of the device support numerous single-ended and differential I/O standards. It is to be understood that PLD 300 is described herein for illustrative purposes only and that the present invention can be implemented in many different types of PLDs, FPGAs, ASICs, and other circuits as well as many different types of external memory devices.

Figure 4:
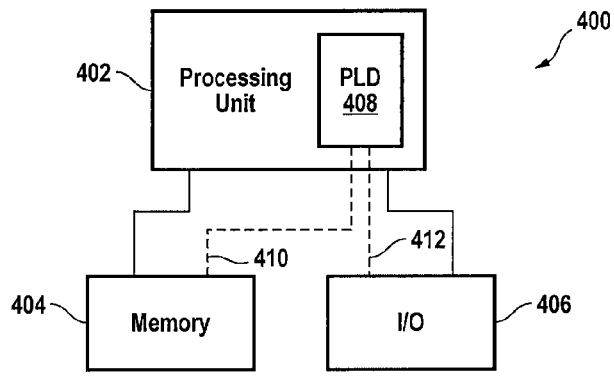
FIG. 4 is a block diagram of an electronic system that can implement embodiments of the present invention.

While PLDs of the type shown in FIG. 3 provide many of the resources required to implement system level solutions, the present invention can also benefit systems wherein a PLD is one of several components. FIG. 4 shows a block diagram of an exemplary digital system 400, within which the present invention can be embodied. System 400 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 400 can be provided on a single board, on multiple boards, or within multiple enclosures.

System 400 includes a processing unit 402, a memory unit 404 and an input/output (I/O) unit 406 interconnected together by one or more buses. Memory unit 404 can be the external memory device 121.

According to this exemplary embodiment, a programmable logic device (PLD) 408 is embedded in processing unit 402. PLD 408 can serve many different purposes within the system in FIG. 4. PLD 408 can, for example, be a logical building block of processing unit 402, supporting its internal and external operations. PLD 408 is programmed to implement the logical functions necessary to carry on its particular role in system operation. PLD 408 can be specially coupled to memory 404 through connection 410 and to I/O unit 406 through connection 412.

Processing unit 402 can direct data to an appropriate system component for processing or storage, execute a program stored in memory 404 or receive and transmit data via I/O unit 406, or other similar function. Processing unit 402 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLDs 408 can control the logical operations of the system. In an embodiment, PLD 408 acts as a reconfigurable processor, which can be reprogrammed as needed to handle a particular computing task. Alternately, programmable logic device 408 can itself include an embedded microprocessor. Memory unit 404 can be a random access memory (RAM), read only memory (ROM), fixed or flexible disk media, PC Card flash disk memory, tape, or any other storage means, or any combination of these storage means.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method for transferring data in parallel from an external memory device to an integrated circuit, the method comprising:
   transferring a start read address from the integrated circuit via data lines to the external memory device;
   providing a clock signal generated by the integrated circuit to the external memory device;
   sequentially generating read addresses in response to the clock signal beginning with the start read address using an address counter in the external memory device;
   reading data stored in the external memory device at the read addresses;
   transferring the data in parallel from the external memory device to the integrated circuit;
   resetting a read address to the start read address when an output enable signal generated by the integrated circuit has a first voltage, wherein the address counter increments the read address in response to the clock signal when the output enable signal has a second voltage.

2. The method as defined in claim 1 wherein the external memory device operates in sequential read mode when the clock signal toggles.

3. The method as defined in claim 1 wherein the external memory device operates in sequential read mode when the integrated circuit sends a sequential read command to the external memory device.

4. The method as defined in claim 1 wherein the integrated circuit is a first programmable integrated circuit that is coupled in series with a plurality of cascaded programmable integrated circuits, and data is transferred in parallel from the external memory device to the cascaded programmable integrated circuits.

5. The method as defined in claim 4 wherein the first programmable integrated circuit is a master device that controls the transfer of the data from the external memory device to the cascaded programmable integrated circuits.

6. The method as defined in claim 1 wherein the integrated circuit is a field programmable gate array and the data is configuration data.

7. The method as defined in claim 1 wherein the integrated circuit is a programmable integrated circuit that is part of a digital system that includes a microprocessor.

8. The method as defined in claim 1 wherein the data is transferred in parallel from the external memory device to the integrated circuit along 8 parallel signal lines.

9. The method as defined in claim 1 wherein the data is transferred in parallel from the external memory device to the integrated circuit along 16 parallel signal lines.

10. The method as defined in claim 1 wherein the external memory device is a FLASH memory.

11. A system for transferring data to an integrated circuit, the system comprising:

an integrated circuit that generates a start read address and a clock signal; and an external memory device including an address counter that sequentially generates read addresses beginning with the start read address supplied from the integrated circuit via data lines and in response to the clock signal, that accesses data stored in a memory array at the read addresses, and that transfers the accessed data along parallel signal lines to the integrated circuit, wherein the address counter resets a read address to the start read address when an output enable signal generated by the integrated circuit has a first voltage, and the address counter increments the read address in response to the clock signal when the output enable signal has a second voltage.

12. The system according to claim 11 wherein the external memory device operates in sequential read mode when the clock signal toggles.

13. The method as defined in claim 11 wherein the external memory device operates in sequential read mode when the integrated circuit sends a sequential read command to the external memory device.

14. The system according to claim 11 wherein the integrated circuit is a first programmable integrated circuit that is coupled in series with a plurality cascaded programmable integrated circuits, and data is transferred in parallel from the external memory device to the cascaded programmable integrated circuits.

15. The system according to claim 14 wherein the first programmable integrated circuit is a master device that controls the transfer of the data from the external memory device to the cascaded programmable integrated circuits.

16. The system according to claim 11 wherein the integrated circuit is a field programmable gate array and the data is configuration data.

17. The system according to claim 11 wherein the integrated circuit is a programmable integrated circuit that is part of a digital system including a microprocessor.

18. The system according to claim 11 wherein the accessed data is transferred in parallel from the external memory device to the integrated circuit along 8 parallel signal lines.

19. The system according to claim 11 wherein the accessed data is transferred in parallel from the external memory device to the integrated circuit along 16 parallel signal lines.

20. The system according to claim 11 wherein the external memory device is a FLASH memory.

* * * * *